United States Patent
Aiso et al.

(10) Patent No.: US 11,795,097 B2
(45) Date of Patent: Oct. 24, 2023

(54) METHOD OF PRODUCING OPTICAL FIBER PREFORM AND OPTICAL FIBER

(71) Applicant: FURUKAWA ELECTRIC CO., LTD., Tokyo (JP)

(72) Inventors: Keiichi Aiso, Tokyo (JP); Tomohiro Gonda, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 419 days.

(21) Appl. No.: 16/869,076

(22) Filed: May 7, 2020

(65) Prior Publication Data

US 2020/0262736 A1    Aug. 20, 2020

Related U.S. Application Data

(60) Division of application No. 15/417,732, filed on Jan. 27, 2017, now Pat. No. 10,676,387, which is a (Continued)

(30) Foreign Application Priority Data

Aug. 6, 2014   (JP) .................................. 2014-160740

(51) Int. Cl.
  C03B 37/014    (2006.01)
  C03B 37/012    (2006.01)
  (Continued)

(52) U.S. Cl.
  CPC ...... C03B 37/01446 (2013.01); C03B 37/014 (2013.01); C03B 37/018 (2013.01); (Continued)

(58) Field of Classification Search
  CPC ........ C03B 37/01446; C03B 37/01228; C03B 37/01231; C03B 37/01248; (Continued)

(56) References Cited

U.S. PATENT DOCUMENTS

| 3,826,560 A | 7/1974 | Schultz |
| 3,932,162 A | 1/1976 | Blankenship |

(Continued)

FOREIGN PATENT DOCUMENTS

| EP | 2 484 644 A1 | 8/2012 |
| EP | 2 910 533 A1 | 8/2015 |

(Continued)

OTHER PUBLICATIONS

International Search Report dated Oct. 20, 2015 in PCT/JP2015/072035 filed on Aug. 4, 2015 (with English translation).

(Continued)

*Primary Examiner* — Galen H Hauth
*Assistant Examiner* — Steven S Lee
(74) *Attorney, Agent, or Firm* — Oblon, McClelland, Maier & Neustadt, L.L.P.

(57) ABSTRACT

A method of producing an optical fiber preform includes a silica glass body forming step of forming a silica glass body to be at least a portion of a core portion. The method includes an alkali-metal-doped silica glass body forming step of forming an alkali-metal-doped silica glass body doped with an alkali metal around the silica glass body such that the alkali-metal-doped silica glass body contacts the silica glass body. The method further includes a diffusing step of diffusing the alkali metal from the alkali-metal-doped silica glass body to the silica glass body by a heat treatment.

4 Claims, 5 Drawing Sheets

Related U.S. Application Data continuation of application No. PCT/JP2015/072035, filed on Aug. 4, 2015.

(51) Int. Cl.
*C03B 37/018* (2006.01)
*C03B 37/025* (2006.01)

(52) U.S. Cl.
CPC .. *C03B 37/01228* (2013.01); *C03B 37/01231* (2013.01); *C03B 37/01248* (2013.01); *C03B 37/01257* (2013.01); *C03B 37/01413* (2013.01); *C03B 37/01466* (2013.01); *C03B 37/025* (2013.01); *C03B 2201/075* (2013.01); *C03B 2201/50* (2013.01); *C03B 2207/34* (2013.01)

(58) Field of Classification Search
CPC ............ C03B 37/01257; C03B 37/014; C03B 37/01413; C03B 37/01466; C03B 37/018; C03B 37/025; C03B 2201/075; C03B 2201/50; C03B 2201/34
See application file for complete search history.

(56) References Cited

U.S. PATENT DOCUMENTS

| | | | |
|---|---|---|---|
| 3,971,645 A | | 7/1976 | Bachmann et al. |
| 4,094,689 A | | 6/1978 | van Ass et al. |
| 4,243,298 A | * | 1/1981 | Kao .................. C03B 37/01211 385/128 |
| 4,749,396 A | | 6/1988 | Hicks, Jr. |
| 5,146,534 A | | 9/1992 | Lines |
| 5,154,745 A | | 10/1992 | Le Sergent |
| 5,318,611 A | * | 6/1994 | Merritt ................ C03B 37/0148 65/416 |
| 5,522,003 A | | 5/1996 | Ward et al. |
| 5,713,979 A | * | 2/1998 | Nicholson ............ C03B 37/0146 65/540 |
| 7,088,900 B1 | * | 8/2006 | Mishra ................. G02B 6/0365 385/127 |
| 7,469,559 B2 | | 12/2008 | Ball et al. |
| 7,524,780 B2 | | 4/2009 | Ball et al. |
| 8,488,932 B2 | | 7/2013 | Bennett et al. |
| 8,798,412 B2 | | 8/2014 | Bookbinder et al. |
| 8,839,646 B2 | | 9/2014 | Haruna et al. |
| 9,097,834 B2 | | 8/2015 | Hirano et al. |
| 9,250,386 B2 | | 2/2016 | Anderson et al. |
| 9,322,990 B2 | | 4/2016 | Hirano et al. |
| 9,340,444 B2 | | 5/2016 | Hirano et al. |
| 2002/0020193 A1 | * | 2/2002 | Shimada ............ C03B 37/01446 65/484 |
| 2002/0051612 A1 | * | 5/2002 | Shimizu ............ C03B 37/01228 385/123 |
| 2002/0094180 A1 | * | 7/2002 | Antos .................. G02B 6/2835 385/127 |
| 2002/0124602 A1 | * | 9/2002 | Onishi ............. C03B 37/01248 65/412 |
| 2002/0197035 A1 | * | 12/2002 | Early .................. C03B 19/1453 385/124 |
| 2004/0057692 A1 | * | 3/2004 | Ball ..................... C03C 25/607 385/142 |
| 2004/0206127 A1 | * | 10/2004 | Coffey ................ C03B 37/0142 65/390 |
| 2005/0063663 A1 | * | 3/2005 | Anderson ............ C03B 37/027 385/142 |
| 2005/0129376 A1 | | 6/2005 | Hanson et al. |
| 2005/0144986 A1 | * | 7/2005 | Bookbinder ...... C03B 37/01211 65/412 |
| 2005/0201699 A1 | * | 9/2005 | Ball ........................ C03C 25/68 501/37 |
| 2006/0130530 A1 | | 6/2006 | Anderson et al. |
| 2008/0050086 A1 | * | 2/2008 | Bickham ........... C03B 37/01453 385/142 |
| 2010/0251771 A1 | | 10/2010 | Langner et al. |
| 2012/0060561 A1 | * | 3/2012 | Kitamura .......... C03B 37/01807 65/399 |
| 2012/0098891 A1 | * | 4/2012 | Xie ...................... B41J 2/14016 347/54 |
| 2012/0198891 A1 | * | 8/2012 | Tamura ............. C03B 37/01228 65/412 |
| 2012/0198892 A1 | * | 8/2012 | Tamura ............. C03B 37/01861 65/428 |
| 2012/0324960 A1 | * | 12/2012 | Sattmann ......... C03B 37/01211 428/376 |
| 2013/0251322 A1 | * | 9/2013 | Kitamura .................. G02B 6/02 65/399 |
| 2014/0106094 A1 | * | 4/2014 | Mundy ............... C03B 19/1492 428/34.4 |
| 2014/0174133 A1 | | 6/2014 | Billings et al. |
| 2015/0241629 A1 | | 8/2015 | Tamura et al. |

FOREIGN PATENT DOCUMENTS

| | | | |
|---|---|---|---|
| JP | 2005-537210 | 12/2005 | |
| JP | 2012-162409 | 8/2012 | |
| JP | 2012-167003 | 9/2012 | |
| JP | 2012-229150 | 11/2012 | |
| JP | 2013-6764 | 1/2013 | |
| JP | 2013-521516 | 6/2013 | |
| JP | WO 2013/118389 A1 | 8/2013 | |
| JP | 2013-199399 | 10/2013 | |
| WO | WO 02/051762 A1 | 7/2002 | |
| WO | WO-02051762 A1 * | 7/2002 | ......... C03B 19/1453 |
| WO | WO-2002051762 A1 * | 7/2002 | ........... C03B 37/018 |
| WO | WO 2004/020357 A2 | 3/2004 | |
| WO | WO-2009034413 A1 * | 3/2009 | ....... C03B 37/01291 |
| WO | WO 2011/106585 A1 | 9/2011 | |
| WO | WO-2013038794 A1 * | 3/2013 | ....... C03B 37/01211 |

OTHER PUBLICATIONS

Written Opinion dated Oct. 20, 2015 in PCT/JP2015/072035 filed on Aug. 4, 2015.
Office Action (Notification of Reason for Refusal) issued in Japanese Patent Application No. 2014-160740 dated May 13, 2016 with machine generated English translation.
Office Action (Decision to Grant a Patent) issued in Japanese Patent Apptication No. 2014480740 dated Jul. 27, 2016 with machine generated Engtish translation.
Extended European Search Report dated Feb. 20, 2018 in Patent Application No. 1582894.1, 7 pages.

\* cited by examiner

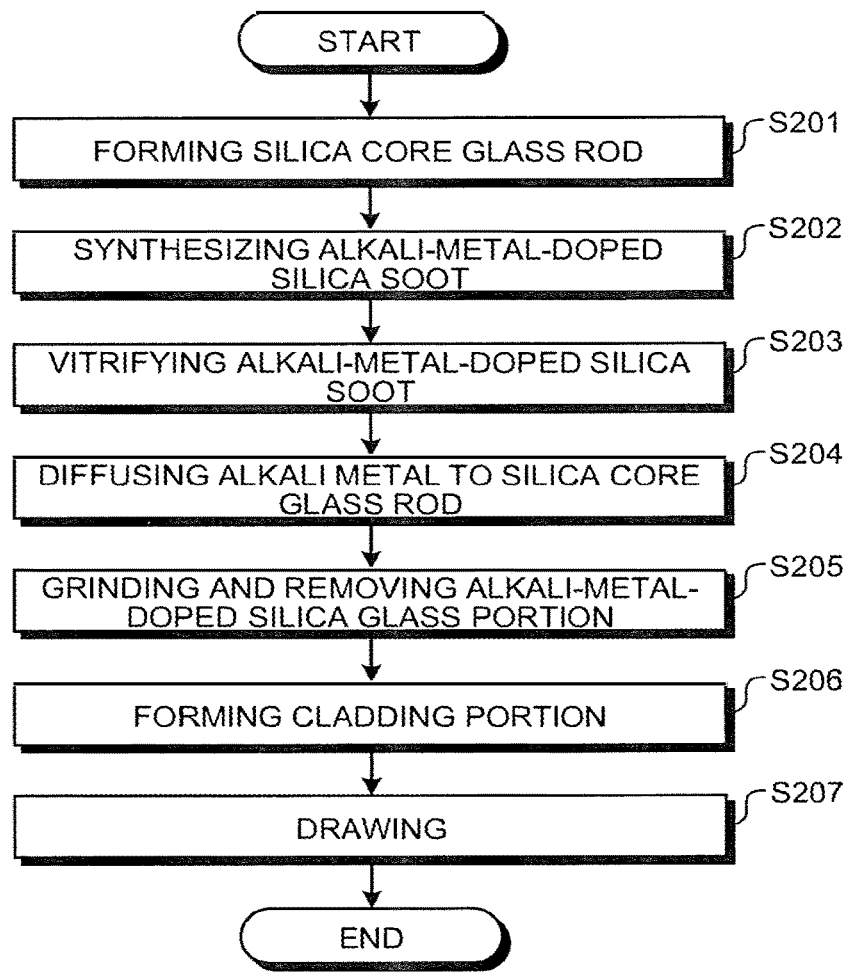
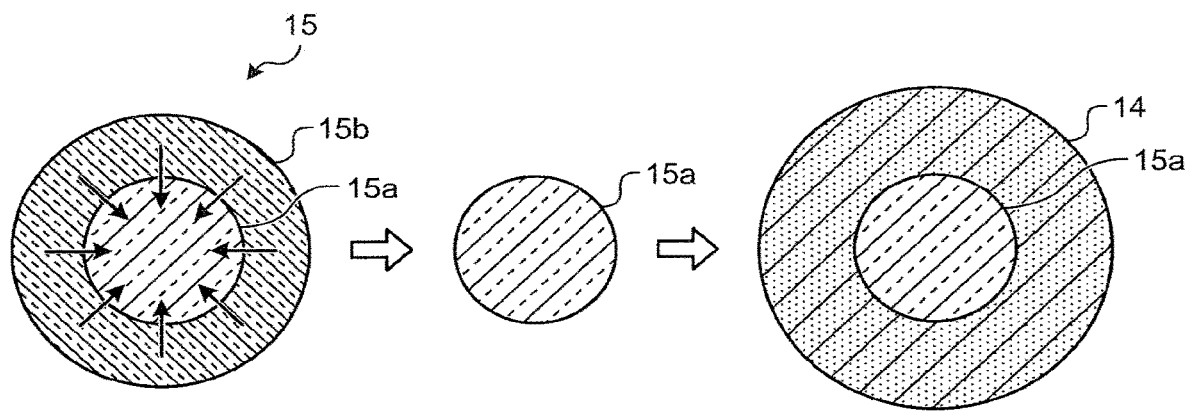

METHOD OF PRODUCING OPTICAL FIBER PREFORM AND OPTICAL FIBER

CROSS-REFERENCE TO RELATED APPLICATION(S)

This application is a divisional of U.S. patent application Ser. No. 15/417,732, filed Jan. 27, 2017, which is a continuation of International Application No. PCT/JP2015/072035, filed on Aug. 4, 2015, which claims the benefit of priority from Japanese Patent Application No. 2014-160740 filed on Aug. 6, 2014. The entire disclosures of the prior applications are hereby incorporated by reference in their entirety.

BACKGROUND

The present disclosure relates to a method of producing an optical fiber preform and an optical fiber.

By realizing a digital coherent transmission technology, speed and capacity in optical fiber transmission have been improved. Along with this, higher signal-to-noise ratio (SNR) is demanded in an optical transmission system, and a lower transmission loss property has been needed for an optical fiber forming a transmission path in the optical transmission system. In order to reduce a transmission loss of the optical fiber, it is effective to reduce a Rayleigh scattering produced in the optical fiber. The Rayleigh scattering is caused by a fluctuation in dielectric permittivity of a glass and involves two factors of composition fluctuation and density fluctuation. The density fluctuation depends on a solidification temperature (fictive temperature) at which it is solidified as a glass from a supercooled liquid state. It is known that a Rayleigh-scattering loss may be reduced by doping a core portion of an optical fiber with an alkali metal since the fictive temperature decreases evidently (See U.S. Pat. No. 5,146,534).

The below-described methods have been proposed as a method of doping the core portion of the optical fiber made of a silica glass with the alkali metal.

For example, a method has been proposed for manufacturing an alkali-metal-doped preform by synthesizing an alkali-metal-doped silica core soot by a vapor phase axial deposition (VAD) method or outside vapor deposition (OVD) method and by dehydrating and vitrifying the core soot (see US Pre-Grant Publication No. 2004/0206127). Moreover, there have been proposed a method of introducing an alkali metal vapor into a silica furnace tube containing a silica core soot to infiltrate the alkali metal to dope the silica core soot therewith (see Japanese Laid-open Patent Publication No. 2013-199399) and a method of diffusing and doping alkali metal from an outer surface of a silica core preform introduced into a silica furnace tube (see US Pre-Grant Publication No. 2005/0129376). Further, there has been proposed a method of diffusing and doping an alkali metal from an inside of a silica tube to be a silica core preform by modified chemical vapor deposition (MCVD) method (see Japanese Laid-open Patent Publication No. 2012-162409).

However, in the method of synthesizing the silica core soot doped with the alkali metal as disclosed in US Pre-Grant Publication No. 2004/0206127, the alkali metal introduced into a silica soot is converted into a chloride and volatilized easily by a chlorine-based gas flown at a subsequent dehydration step. Therefore, it is difficult to leave the alkali metal at the core portion at a desirable concentration. In the method of making the alkali metal infiltrated to the silica core soot as disclosed in Japanese Laid-open Patent Publication No. 2013-199399, the silica core soot is doped with impurities such as a transition metal or the like contained in alkali metal material together with the alkali metal. In order to remove the impurities, it is effective to infiltrate the alkali metal to the silica core soot and then perform a dehydrating-and-purifying step using chlorine. However, in this case, since the alkali metal tends to be volatilized for the above-described reason, it is difficult to obtain a desirable doping amount of alkali-metal. On the other hand, in the method as disclosed in US Pre-Grant Publication No. 2005/0129376 which diffuses the alkali metal from the silica core preform's surface, there is a problem of decreased doping efficiency since most of the used alkali metal is exhausted to outside a furnace without being diffused in the silica core member. In the method as disclosed in Japanese Laid-open Patent Publication No. 2012-162409 which diffuses and dopes the alkali metal from an inside of a silica tube, there is a tendency of ovalization of the silica tube by a decreased viscosity accompanying an increase in the silica tube's temperature in a step of diffusing the alkali metal to an inside of the silica tube from an alkali metal layer deposited on a silica tube's inner wall. Therefore, it is difficult to maintain the silica tube at a higher temperature for a long time, and thus, an amount of diffusion of the alkali metal into the inside of the silica tube is limited. In addition, since an alkali metal layer with a higher concentration is deposited on inner wall of the silica tube, a crystal phase (cristobalite) is generated with the alkali metal as a core, and thus, there is a problem that a fine crack is produced easily on the surface of the glass.

There is a need for a method of producing an optical fiber preform which realizes easily and effectively doping a core portion with a desirable concentration of alkali metal and producing an optical fiber preform having very low impurity concentration, and a method of producing an optical fiber which may easily produce an optical fiber having low transmission loss.

SUMMARY

It is an object of the present disclosure to at least partially solve the problems in the conventional technology.

According to one aspect of the present disclosure, there is provided a method of producing an optical fiber preform including: an alkali-metal-doped silica glass body forming step of forming an alkali-metal-doped silica glass body doped with an alkali metal; a silica glass body forming step of forming a silica glass body to be at least a portion of a core portion around the alkali-metal-doped silica glass body such that the silica glass body contacts the alkali-metal-doped silica glass body; and a diffusing step of diffusing the alkali metal from the alkali-metal-doped silica glass body to the silica glass body by a heat treatment.

According to another aspect of the present disclosure, there is provided a method of producing an optical fiber preform including: a silica glass body forming step of forming a silica glass body to be at least a portion of a core portion; an alkali-metal-doped silica glass body forming step of forming an alkali-metal-doped silica glass body doped with an alkali metal around the silica glass body such that the alkali-metal-doped silica glass body contacts the silica glass body; and a diffusing step of diffusing the alkali metal from the alkali-metal-doped silica glass body to the silica glass body by a heat treatment.

According to further aspect of the present disclosure, there is provided a method of producing an optical fiber including drawing an optical fiber preform produced by a method of producing an optical fiber preform. The method of producing an optical fiber preform includes: an alkali-metal-doped silica glass body forming step of forming an alkali-metal-doped silica glass body doped with an alkali metal; a silica glass body forming step of forming a silica glass body to be at least a portion of a core portion around the alkali-metal-doped silica glass body such that the silica glass body contacts the alkali-metal-doped silica glass body; and a diffusing step of diffusing the alkali metal from the alkali-metal-doped silica glass body to the silica glass body by a heat treatment.

According to still another aspect of the present disclosure, there is provided a method of producing an optical fiber including drawing an optical fiber preform produced by a method of producing an optical fiber preform. The method of producing an optical fiber preform includes: a silica glass body forming step of forming a silica glass body to be at least a portion of a core portion; an alkali-metal-doped silica glass body forming step of forming an alkali-metal-doped silica glass body doped with an alkali metal around the silica glass body such that the alkali-metal-doped silica glass body contacts the silica glass body; and a diffusing step of diffusing the alkali metal from the alkali-metal-doped silica glass body to the silica glass body by a heat treatment.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 7 is a view for explaining a producing method according to a second embodiment; and FIG. 8 is a view for explaining a step of diffusing an alkali metal, a grinding-and-removing step, and a cladding-portion-forming step.

DETAILED DESCRIPTION

Next, embodiments of a method of producing an optical fiber preform and an optical fiber according to the present disclosure will be explained in detail with reference to the drawings. The present disclosure is not limited to the below-explained embodiments. Any terms not specifically defined in the description follow definitions and measuring methods of the ITU-T (International Telecommunication Union Standardization Sector) G. 650.1.

Figure 1:
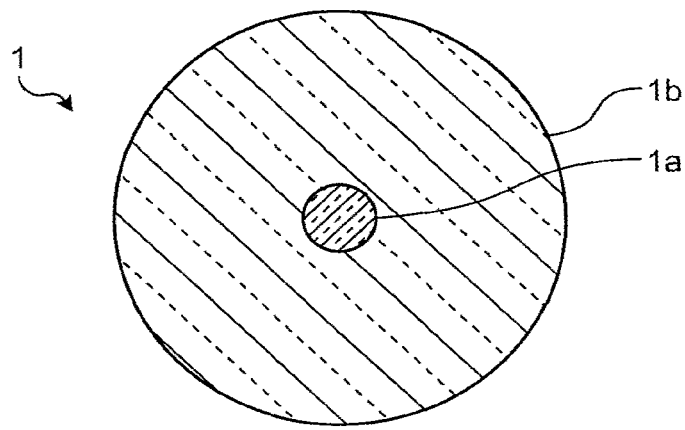
FIG. 1 is a schematic cross-sectional view of an optical fiber preform by a producing method according to a first embodiment.

(First Embodiment) As a first embodiment of the present disclosure, a case of producing an optical fiber preform and further producing an optical fiber by using that will be explained. FIG. 1 is a schematic cross-sectional view of the optical fiber preform by a producing method according to the first embodiment. As illustrated in FIG. 1, the optical fiber preform 1 is provided with a core portion 1a and a cladding portion 1b formed around an outer circumference of the core portion 1a.

The core portion 1a is made of a glass doped with an alkali metal. The cladding portion 1b is made of a silica glass doped with fluorine that is a refractive-index-decreasing dopant. Herein the alkali metal is selected arbitrary from potassium (K), sodium (Na), lithium (Li), cesium (Cs), and rubidium (Rb). In the first embodiment, the alkali metal is potassium.

Figure 2:
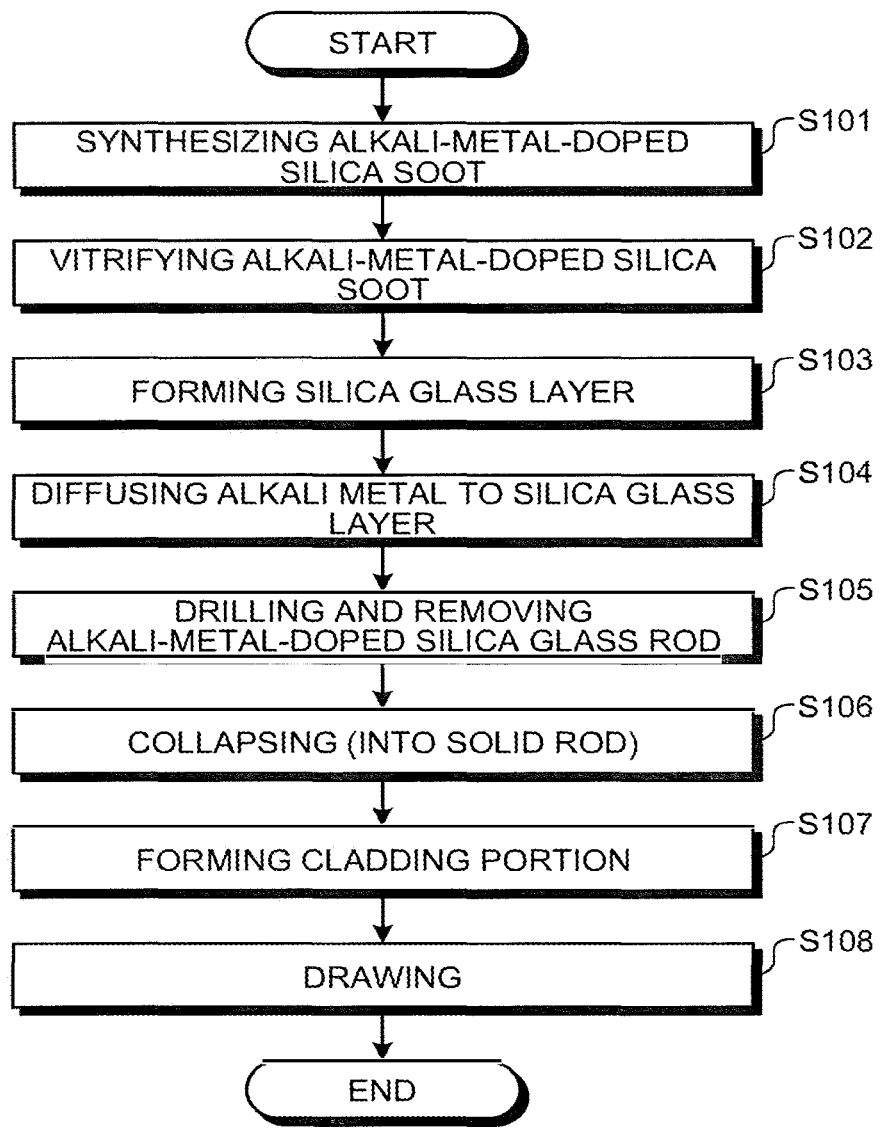
FIG. 2 is a flow-chart of the producing method according to the first embodiment.

Next the producing method according to the first embodiment will be explained. FIG. 2 is a flow-chart of the producing method according to the first embodiment. In the first embodiment, to start with, an alkali-metal-doped silica soot doped with the alkali metal is synthesized (step S101). Then, an alkali-metal-doped silica glass rod that is an alkali-metal-doped silica glass body is formed by vitrifying the alkali-metal-doped silica soot (step S102). Then, a silica glass layer that is a silica glass body is formed around the alkali-metal-doped silica glass rod so as to contact the alkali-metal-doped silica glass rod (step S103). Then, the alkali metal is diffused to the silica glass layer from the alkali-metal-doped silica glass rod by heat treatment (step S104). Then, the alkali-metal-doped silica glass rod is drilled and removed (step S105). Then, the silica glass layer is collapsed into a solid rod (step S106). An obtained silica glass rod in the solid rod becomes the core portion 1a of the optical fiber preform 1. Then, the cladding portion 1b is formed around the obtained silica glass rod in the solid rod (step S107). Hereby the optical fiber preform 1 is produced. Moreover, the optical fiber is produced by drawing the produced optical fiber preform 1 by a well-known drawing apparatus or the like (step S108).

In the producing method according to the first embodiment, the alkali metal is diffused to the silica glass layer from the alkali-metal-doped silica glass rod by heat treatment. Herein diffusion coefficients for OH group and transition metal contained in the alkali-metal-doped silica glass rod are very small in comparison to a diffusion coefficient for the alkali metal by, for example, two orders of magnitude. For example, although a diffusion coefficient for potassium in the silica glass is $1.0 \times 10^{-8}$ cm$^2$/s at 1000° C., a diffusion coefficient for OH group in the silica glass is approximately $7.3 \times 10^{-9}$ cm$^2$/s even at a higher temperature of 1600° C. Therefore, while the alkali metal is diffused to the silica glass layer by heat treatment, a quantity of impurities such as the OH group and the transition metal diffused to the silica glass layer may be decreased. As a result, in the silica glass layer and in the silica glass rod that is a core portion obtained by making this silica glass layer into a solid rod, the concentration of the alkali metal may be increased and impurity concentrations of the OH group, the transition metal, and the like may be decreased sufficiently.

Figure 3:
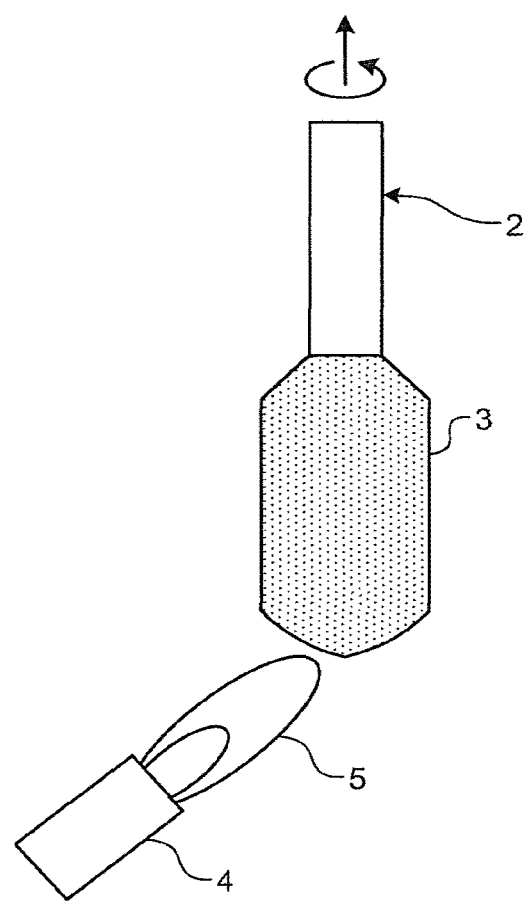
FIG. 3 is a view for explaining a step of synthesizing an alkali-metal-doped silica soot.

Next, each step will be explained more in concrete. FIG. 3 is a view for explaining the step of synthesizing the alkali-metal-doped silica soot at the step S101. In this step, an alkali-metal-doped silica soot 3 is synthesized at a lower end of a target rod 2 made of silica glass by using a well-known VAD apparatus. More specifically, the alkali-metal-doped silica soot 3 is synthesized by lifting up and rotating the target rod 2 by the well-known VAD apparatus, and by projecting a flame 5 from a burner 4 having a concentric multi-tube structure.

Herein, a silicon tetrachloride ($SiCl_4$) gas as a main source gas, an alkali metal material, a hydrogen ($H_2$) gas as a combustible gas, an oxygen ($O_2$) gas as a combustion-assisting gas, and an inert gas as a buffer gas are supplied to the burner 4. By a hydrolysis reaction of these gases in the flame, a silica glass particle doped with the alkali metal is sprayed to, and deposited on, the target rod 2, and thereby the alkali-metal-doped silica soot 3 is formed.

A chloride, a nitrate, an iodized product, a bromide, and the like of the alkali metal may be used as the alkali metal material. In the first embodiment, a potassium chloride (KCl) is used as the alkali metal material. Since the above-described alkali metal material is generally solid at a normal temperature with a low vapor pressure, it is difficult to transfer the above-described alkali metal material to a VAD reaction unit in a vapor state. To address this, in the first embodiment, a temperature of the potassium chloride is increased to a melting point (776° C.) or higher by an electric furnace heated at 900° C., the potassium chloride is fused and evaporated, and then cooled and condensed by a cooling gas, to produce aerosol particles. Then, the aerosol particles are floated and dispersed in an argon (Ar) gas as a carrier gas to be transferred to the burner 4.

Although, in the first embodiment, the alkali metal material is turned into the aerosol particles to be transferred in a piping, a method utilizing other transfer forms may be employed. For example, a liquid solution of an alkali metal material may be sprayed by using an ultrasonic atomization apparatus to transfer with a carrier gas to a reaction unit. Moreover, although the argon is used as the carrier gas for transferring the aerosol particles, a gas other than the argon, for example, such as a helium gas, a nitrogen gas, etc. may be used. The alkali-metal-doped silica soot 3 may be synthesized by using an OVD method.

Next, the step of forming the alkali-metal-doped silica glass rod by vitrifying the alkali-metal-doped silica soot 3 at the step S102 will be explained. In the first embodiment, a dehydration step in a chlorine-based gas atmosphere is not performed in the vitrification step when forming the alkali-metal-doped silica glass rod, but only a sintering step as a heat treatment in a non-chlorine-based atmosphere will be performed. By omitting the dehydration step using a chlorine-based gas in this manner, it is possible to suppress volatilization of the alkali metal (potassium) doped to the alkali-metal-doped silica soot 3, thereby the alkali-metal-doped silica glass rod doped with a desirable concentration of the alkali metal may be obtained.

More specifically, the alkali-metal-doped silica soot 3 is introduced into a furnace tube of a heat treatment furnace, only the helium gas that is the non-chlorine-based gas is supplied to the furnace tube, and the alkali-metal-doped silica soot 3 is sintered in the helium gas atmosphere, thus the alkali-metal-doped silica glass rod is obtained. The non-chlorine-based gas, which is not limited to helium, may be a mixture gas of helium and oxygen. In the first embodiment, the sintering step is performed at 1050° C. of the furnace temperature to obtain the alkali-metal-doped silica glass rod with an outer diameter of 25 mm. The value of the outer diameter is not limited to a specific value. By doping the silica soot with the alkali metal in this manner, a softening temperature of the glass decreases evidently. In the silica soot doped with potassium as in the first embodiment, a densification begins at a temperature of approximately 950° C. that is lower than that of a pure silica soot by equal to or more than several hundreds of degrees Celsius. Since potassium accelerates the crystallization of the silica glass, the crystallization occurs evidently when the sintering temperature is high, the silica glass hardly becomes amorphous, and a crack is produced. Therefore, in terms of suppressing the crystallization, a preferable temperature range for the sintering step exists. The temperature range is preferably within a range of 950° C. to 1300° C., and more preferably within a range of 1000° C. to 1250° C.

Although the dehydration step using the chlorine-based gas is omitted in the first embodiment, the dehydration step may be performed under a condition not causing potassium volatilization evidently. When potassium chloride is isolated, that is, not introduced in the network of the silica glass in the step of synthesizing the alkali-metal-doped silica soot, the potassium chloride may possibly cause bubble and segregation of crystal in the sintering step and worsen homogeneity of the glass. Therefore, sometimes it may be effective to perform the dehydration step under a condition not causing the volatilization of potassium introduced to the glass network evidently to remove the isolated potassium chloride in advance. The condition not causing the volatilization of potassium introduced to the glass network evidently refers to, for example, conditions such as a lower processing temperature, a shorter processing time, or a lower chlorine partial pressure, relative to a general dehydration condition. In a case of the dehydration step using the chlorine-based gas, although a general dehydration temperature is 1100° C. to 1250° C., the volatilization of the potassium introduced to the glass network becomes evident in this temperature range. In order to suppress the evident volatilization of potassium, it is preferable to set the dehydration temperature (furnace temperature) at 1000° C. or lower. Since the densification of the alkali-metal-doped silica soot begins approximately at 950° C., it is more preferable to set the dehydration temperature at 950° C. or lower to prevent the soot from contracting at the dehydration step. However, when using, as a heat treatment furnace, a heat treatment furnace including a furnace tube made of silica, and if the furnace temperature is set approximately at 800° C. or lower, a crack may be possibly produced in the furnace tube; therefore, it is preferable to set the furnace temperature at 800° C. or higher. Although, when dehydrating, a general chlorine partial pressure is approximately 1% to 2%, a range of 0.1% to 1% is preferable in terms of suppressing the evident volatilization of the potassium introduced to the glass network. Moreover, for a dehydration agent for performing the dehydration, a non-chlorine-based gas such as silicon tetrafluoride, carbon monoxide, and the like may be used instead of the chlorine gas. When using the non-chlorine-based gas, it is also preferable to set a furnace temperature at which the contraction of the soot is prevented at the dehydration step.

In the first embodiment, prior to the step of forming the silica glass layer, the alkali-metal-doped silica glass rod having an outer diameter of 25 mm is stretched to have the outer diameter of 13 mm. Although the alkali-metal-doped silica glass rod after the vitrification at the step S102 may be sometimes devitrified due to segregation of a crystal phase caused by potassium, the alkali-metal-doped silica glass rod becomes transparent glass because the crystal phase is fused by an increased temperature due to an oxyhydrogen flame when being stretched. However, such a stretching step may be omitted.

Next, as the step S103, the step of forming the silica glass layer around the alkali-metal-doped silica glass rod so as to contact the alkali-metal-doped silica glass rod will be explained. In the first embodiment, a highly pure silica tube with an outer diameter of 25 mmφx an inner diameter of 20 mmφ is jacketed on an outer circumference of the alkalimetal-doped silica glass rod stretched to have the outer diameter of 13 mm, that is, the alkali-metal-doped silica glass rod is inserted to and integrated with the silica tube to form a highly pure silica glass layer. An outer diameter of the silica glass rod thus formed and jacketed is, for example, 23.8 mm. Although, in the first embodiment, the step of forming the silica glass layer is performed by jacketing the silica tube, this silica glass layer may be formed by forming a silica soot on an outer circumference of the alkali-metal-doped silica glass rod by, for example, the OVD method, and by dehydrating and sintering this silica soot.

Figure 4A:
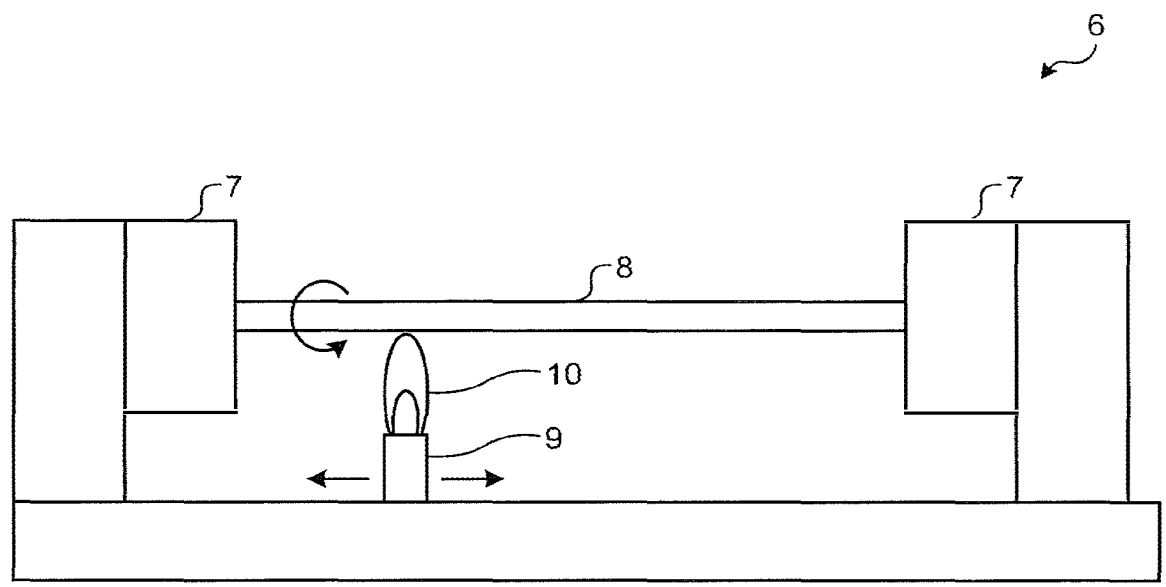
FIG. 4A is a view for explaining a step of diffusing an alkali metal.
Figure 4B:
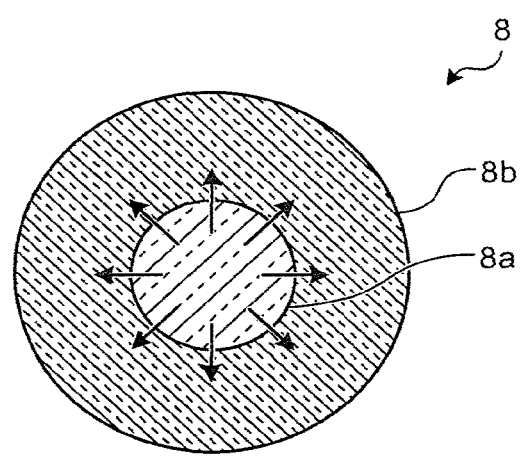
FIG. 4B is a view for explaining a step of diffusing the alkali metal.

Next, as the step S104, the step of diffusing the alkali metal from the alkali-metal-doped silica glass rod to the silica glass layer by heat treatment will be explained. In this step, potassium is diffused from an area of the alkali-metal-doped silica glass to an area of the silica glass layer formed on the outer circumference thereof. FIGS. 4A and 4B are views for explaining the diffusion step of the alkali metal. FIG. 4A is a schematic diagram showing an essential part of a glass lathe used in the present diffusion step, and FIG. 4B is a view showing how the alkali metal is diffused.

To start with, a silica glass rod 8 formed at the step S103 is set, as a target rod, at a chucking 7 of a glass lathe 6, and a temperature thereof is increased, for example, at about 2000° C. by heating the silica glass rod 8 with a flame 10 from an oxyhydrogen burner 9 reciprocating along a longitudinal direction of the silica glass rod 8 while rotating the silica glass rod 8 around its axis. Hereby, as illustrated by an arrow in FIG. 4B, the alkali metal (potassium) is diffused from an alkali-metal-doped silica glass rod 8a to a silica glass layer 8b in the silica glass rod 8. Since diffusion coefficients of the OH group and the transition metal contained in this state of the alkali-metal-doped silica glass rod 8a are very small in comparison to the diffusion coefficient of the alkali metal, the alkali metal is selectively diffused to the silica glass layer 8b. As a result, in the silica glass layer 8b, it is possible to increase the concentration of the alkali metal and sufficiently decrease the impurity concentrations of the OH group, the transition metal and the like. Moreover, since the alkali metal is diffused from one glass to another glass in contact, a doping efficiency is higher than that in a case of diffusing the alkali metal from a glass surface in a vapor state.

In terms of accelerating the diffusion of the potassium in the silica glass, it is preferable to increase the surface temperature of the silica glass rod 8 to 1600° C. or higher. It is possible to diffuse potassium to an area of the silica glass layer 8b further in a short time by increasing the temperature preferably to 1800° C. or higher, and more preferably to 2000° C. or higher. In the first embodiment, a movement speed of the oxyhydrogen burner 9 is set at 20 mm/min, and the oxyhydrogen burner 9 is reciprocated five times along the entire length of the silica glass rod 8. The movement distance and the number of reciprocation of the oxyhydrogen burner 9 are set appropriately in accordance with an outer diameter of the alkali-metal-doped silica glass rod 8a and a thickness of the silica glass layer 8b formed outside thereof such that the alkali metal is diffused sufficiently to the silica glass layer 8b. In order to further accelerate the diffusion of the alkali metal to the silica glass layer 8b, a step of stretching the silica glass rod 8 may be performed. Although, in the first embodiment, the alkali metal is diffused by performing zone heating to the silica glass rod 8 by using the oxyhydrogen burner 9, a heating method for diffusing the alkali metal is not limited to that, and other heat sources, for example, an electric furnace, a plasma flame and the like may be used for heating. However, by using the oxyhydrogen burner 9, the heat zone may be narrowed, and thus an advantage of hardly causing a deformation of the silica glass rod 8 even at a higher temperature of the silica glass rod 8 is obtained.

Figure 5:
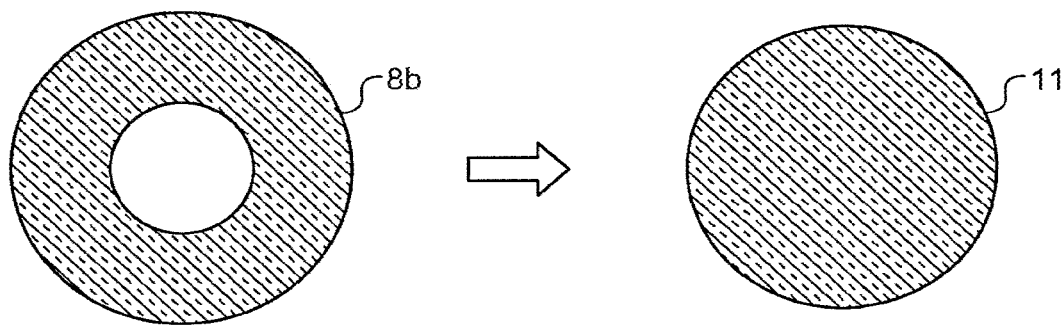
FIG. 5 is a view for explaining a step of a drilling-and-removing step and a collapsing step.

Next, the step of drilling and removing the alkali-metal-doped silica glass rod 8a at the step S105 and the step of collapsing the silica glass layer 8b into a solid rod at the step S106 will be explained. FIG. 5 is a view for explaining the drilling-and-removing step and the collapsing step. As illustrated in FIG. 5, in the drilling-and-removing step, a drilling operation is performed to the silica glass rod 8 with a drill or the like to remove the alkali-metal-doped silica glass rod 8a such that only the silica glass layer 8b remains. Although the diameter of the alkali-metal-doped silica glass rod 8a is 13 mm as described in the above, in the first embodiment, a drilling diameter is set at 15 mm in consideration of diffusion distances of the OH group and the transition metal, and a 1 mm thickness region of the silica glass layer 8b, to which the OH group and the transition metal are considered to be diffused to some degree, is also removed. Hereby the impurity concentration of the silica glass layer 8b is further reduced. The thickness of the removed silica glass layer 8b may be adjusted appropriately in accordance with a temperature or the like in the diffusion step.

Thereafter, the chlorine gas is supplied to a hole of the silica glass layer 8b and heated, and after an inner-surface-treatment is performed, the silica glass layer 8b is collapsed, while decompressing the inside of the hole, by heating the silica glass layer 8b from one end as illustrated in FIG. 5. Hereby, the hole formed at the step S105 is blocked, thus, the silica glass layer 8b is turned into a solid rod to become a silica glass rod 11. A diameter of the silica glass rod 11 after the collapsing step is, for example, 18 mm. When performing the inner-surface-treatment, since potassium is introduced in the glass, the inner-surface-treatment may be performed at the above-described general dehydration temperature. It is preferable to perform the inner-surface-treatment at a temperature increased to some degree (for example, 1200° C. or higher) because a purification of an inner surface (removal of impurity) is accelerated.

Figure 6:
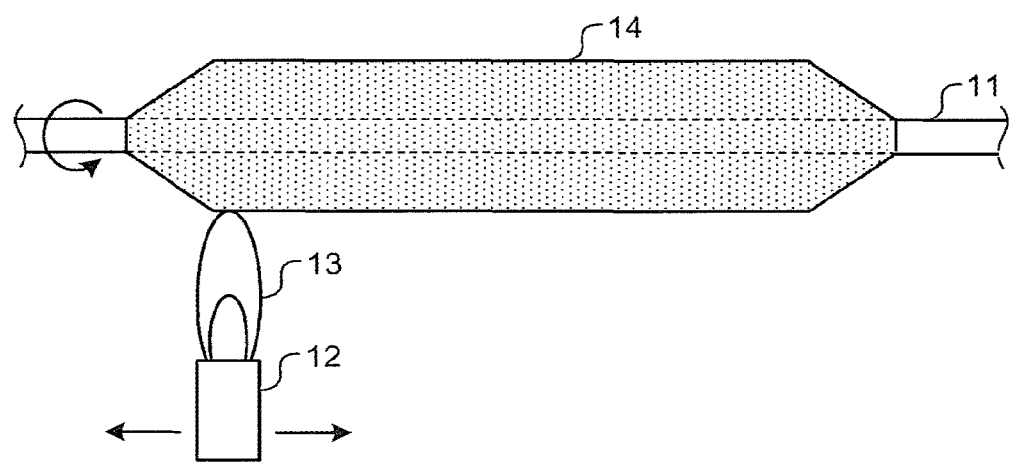
FIG. 6 is a view for explaining a cladding-portion-forming step.

Next, the step of forming the cladding portion 1b around the silica glass rod 11 at the step S107 will be explained. FIG. 6 is a view for explaining the cladding-portion-forming step. In this step, an SiCl$_4$ gas, a H$_2$ gas, an O$_2$ gas, and the inert gas are supplied by using the OVD method to a burner 12 making a reciprocation movement along the longitudinal direction of the silica glass rod 11 while rotating the silica glass rod 11 around its axis, a flame 13 is projected to the silica glass rod 11 to synthesize a silica soot 14. After that, the silica soot 14 is doped with fluorine for vitrification in a heat treatment furnace to obtain the cladding portion 1b. Hereby it is possible to produce the optical fiber preform 1 as illustrated in FIG. 1 including the silica glass rod 11 as the core portion 1a. In the optical fiber preform 1 produced as described above, the core portion 1a is easily and efficiently doped with a desirable concentration of the alkali metal, and the impurity concentration of the OH group, the transition metal and the like are very low.

Although the cladding portion 1b was formed by using the OVD method in the first embodiment, the cladding portion 1b may be formed by over-cladding a silica tube doped with fluorine on the silica glass rod 11.

Thereafter, by drawing the optical fiber preform 1 by the well-known drawing apparatus at the step S108, an optical fiber with reduced Rayleigh scattering and thus with low transmission loss may be produced.

As a first example of the present disclosure, the alkali-metal-doped silica glass rod was produced in accordance with the first embodiment, a quantitative analysis of potassium concentration was performed by using an inductively coupled plasma (ICP) method, and the potassium concentration was 1 wt %. In addition, a quantitative analysis of OH concentration of the alkali-metal-doped silica glass rod was performed by using a Fourier transfer infrared absorption spectroscopy (FT-IR) method, and the OH concentration was 300 ppm or higher. On the other hand, according to a quantitative analysis, performed thereafter, of the potassium concentration of the silica glass rod turned into a solid rod in accordance with the first embodiment, the potassium concentration was 0.12 wt %. Moreover, according to a quantitative analysis of the OH concentration in the center portion of the silica glass rod by the FT-IR method, the OH concentration was equal to or less than the detection limit (approximately 1 ppm).

Moreover, the optical fiber preform obtained in accordance with the first embodiment is drawn to produce an optical fiber conforming to ITU-T G.652, and its transmission loss at a wavelength of 1550 nm was measured to be a very low value, i.e., 0.158 dB/km. In addition, an amount of increase in transmission loss, caused by OH absorption, at a wavelength of 1385 nm in the optical fiber was measured to be a sufficiently low value, i.e., about 0.3 dB/km, with which the optical fiber may be used for transmission at the wavelength band.

(Second Embodiment) Next, a second embodiment of the present disclosure will be explained. In the second embodiment, the optical fiber preform 1 illustrated in FIG. 1 is also produced, and then an optical fiber is produced by drawing the optical fiber preform 1.

Next, a producing method according to the second embodiment will be explained. FIG. 7 is a flow-chart of the producing method according to the second embodiment. In the second embodiment, to start with, a silica core glass rod that is a silica glass body to be the core portion 1a is formed (step S201). Then, the alkali-metal-doped silica soot doped with the alkali metal is synthesized around the silica core glass rod so as to contact the silica core glass rod (step S202), thereafter the vitrification is performed (step S203). Hereby, an alkali-metal-doped silica glass portion contacting the silica core glass rod is formed around the silica core glass rod. Then, the alkali metal is diffused from the alkali-metal-doped silica glass portion to the silica core glass rod by heat treatment (step S204). Then, the alkali-metal-doped silica glass portion is removed by grinding (step S205). Then, the cladding portion 1b is formed around the silica core glass rod (step S206). Hereby, the optical fiber preform 1 is produced. Moreover, the optical fiber is produced by drawing the produced optical fiber preform 1 by the well-known drawing apparatus or the like (step S207).

In the producing method according to the second embodiment, the alkali metal is diffused from the alkali-metal-doped silica glass portion to the silica core glass rod by heat treatment. Hereby, similarly to the first embodiment, in the silica core glass rod to be the core portion 1a, the concentration of the alkali metal may be increased and impurity concentrations of the OH group, the transition metal and the like may be decreased sufficiently.

Next, each step will be explained more specifically. To start with, in the step of forming the silica core glass rod at the step S201, the silica soot is synthesized by supplying the $SiCl_4$ gas, the $H_2$ gas, the $O_2$ gas and the inert gas to a burner by using the VAD method, for example, illustrated in FIG. 3, the dehydration step and the sintering step similar to those in a common production process of core preforms of optical fibers are performed to the silica soot to form a highly pure silica core glass rod having an outer diameter of 60 mm. The value of the outer diameter is not especially limited. In the second embodiment, the silica core glass rod thus formed is stretched to have the outer diameter of 20 mm.

Next, the step of synthesizing the alkali-metal-doped silica soot at the step S202 will be explained. In this step, the alkali-metal-doped silica soot doped with the alkali metal is synthesized on an outer circumference of the silica core glass rod, as a target rod, formed at the step S201 by using the OVD method as illustrated in FIG. 6. In the second embodiment, alkali metal is potassium, and potassium chloride (KCl) is used as the alkali metal material. The potassium chloride is turned into aerosol particles similarly to the step S101 of the first embodiment and transferred to the burner of the OVD apparatus with the argon used as the carrier gas. Then, the KCl aerosol particles and the silica glass material are projected together with the oxyhydrogen flame by the burner to the outer circumference of the silica core glass rod, thus, the alkali-metal-doped silica soot is formed so as to contact the silica core glass rod. In the second embodiment, similarly to the first embodiment, a method using other transfer forms may be employed. For example, a method in which a liquid solution of an alkali metal material is turned into a mist state by using an ultrasonic atomization apparatus to transfer to a reaction unit with a carrier gas. A gas such as a helium gas, a nitrogen gas or the like other than argon may be used as the carrier gas for the aerosol particles.

Next, the step of vitrifying the alkali-metal-doped silica soot at the step S203 will be explained. Similarly to the step S102 of the first embodiment, the dehydration step in a chlorine-based gas atmosphere is not performed in the vitrification step, but only the sintering step as heat treatment in a non-chlorine-based atmosphere will be performed. Hereby, it is possible to suppress volatilization of the alkali metal (potassium) with which the alkali-metal-doped silica soot is doped, and thereby the alkali-metal-doped silica glass rod doped with a desirable concentration of the alkali metal is obtained. Although, in the sintering step, a helium gas that is a non-chlorine-based gas is used as an atmosphere and the furnace temperature is 1080° C., the furnace temperature may be similar to the step S102 of the first embodiment. Similarly to the first embodiment, the dehydration step may be performed under a condition not causing potassium volatilization evidently. In the second embodiment, a silica glass rod having an outer diameter of 36 mm is obtained in which the alkali-metal-doped silica soot vitrified to become the alkali-metal-doped silica glass portion.

Next, the step of diffusing the alkali metal from the alkali-metal-doped silica glass portion to the silica core glass rod by heat treatment at the step S204, the step of grinding and removing the alkali-metal-doped silica glass portion at the step S205, and the step of forming the cladding portion 1b around the silica core glass rod will be explained.

In the step of diffusing the alkali metal, the alkali metal is diffused from a region of the alkali-metal-doped silica glass portion to a region of the silica core glass rod inside of the alkali-metal-doped silica glass portion. This step is performed by the glass lathe 6 illustrated in FIG. 4A similarly to the step S104 of the first embodiment. In the second embodiment, the oxyhydrogen burner 9 is reciprocated along the entire length of the silica glass rod seven times while a temperature of a surface of the silica glass rod is increased to 2100° C. and a movement speed of the oxyhydrogen burner 9 is set at 20 mm/min. Hereby, as illustrated in an arrow in FIG. 8, the alkali metal (potassium) is diffused from an alkali-metal-doped silica glass portion 15b to a silica core glass rod 15a in a silica glass rod 15. The movement distance and the number of reciprocation of the oxyhydrogen burner 9 are set appropriately in accordance with an outer diameter of the silica core glass rod 15a and a thickness of the silica glass layer 15b formed outside thereof so that the alkali metal is sufficiently diffused to the silica glass layer 15b. In order to further accelerate the diffusion of the alkali metal, a step of stretching the silica glass rod may be performed.

Although, in the second embodiment, the alkali metal is diffused by performing a zone heating to the silica glass rod 15 by using the oxyhydrogen burner 9, a heating method for diffusing the alkali metal is not limited to that, and other heat sources, for example, an electric furnace, a plasma flame and the like may be used for heating. However, by using the oxyhydrogen burner 9, the heat zone may be narrowed, and thus an advantage of hardly causing a deformation of the silica glass rod 15 even at a higher temperature of the silica glass rod 15 is obtained.

In the step of grinding and removing the alkali-metal-doped silica glass portion, as illustrated in FIG. 8, the alkali-metal-doped silica glass portion 15b is removed by grinding from the silica glass rod 15 so that only the silica core glass rod 15a remains. For the grinding and removing method, mechanical grinding, chemical grinding such as etching or the like may be used. Herein, as described above, although the diameter of the silica core glass rod 15a is 20 mm, in the second embodiment, the silica core glass rod 15a is ground to have a diameter of 18 mm in consideration of the diffusion distances of the OH group and the transition metal, a 1 mm thickness region of the silica core glass rod 15a to which the OH group and the transition metal are considered to be diffused to some degree, is also removed. Hereby the impurity concentration of the silica core glass rod 15a is further reduced. The thickness of the removed region of the silica core glass rod 15a may be adjusted appropriately in accordance with a temperature or the like in the diffusion step.

The step of forming the cladding portion 1b around the silica core glass rod may be performed similarly to the step S107 of the first embodiment. That is, the silica soot 14 is synthesized on an outer circumference of the silica core glass rod 15a by using, for example, the OVD method as illustrated in FIG. 8. After that, the silica soot 14 is doped with fluorine for vitrification in a vitrification furnace to obtain the cladding portion 1b. Hereby it is possible to produce the optical fiber preform 1 as illustrated in FIG. 1 including the silica core glass rod 15a as the core portion 1a. In the optical fiber preform 1 produced as described above, the core portion 1a is easily and efficiently doped with a desirable concentration of the alkali metal, and the impurity concentrations of the OH group, the transition metal and the like are very low. In the second embodiment, similarly to the first embodiment, the cladding portion 1b may be formed by over-cladding a silica tube doped with fluorine on the silica glass rod 15.

Thereafter, by drawing the optical fiber preform 1 by the well-known drawing apparatus at the step S207, an optical fiber with reduced Rayleigh scattering and thus with low transmission loss may be produced.

As a second example of the present disclosure, the silica glass rod was produced in accordance with the second embodiment, and a quantitative analysis of potassium concentration was performed to the alkali-metal-doped silica glass rod by using the ICP analysis method. According to the analysis, the potassium concentration was 0.85 wt %. According to a quantitative analysis for the OH concentration by using the Fourier transformation infrared spectrophotometry FT-IR method, the OH concentration was 300 ppm or higher. On the other hand, according to a quantitative analysis, performed thereafter, of the potassium concentration of the silica glass rod obtained by grinding and removing the alkali-metal-doped silica glass portion in accordance with the second embodiment, the potassium concentration was 0.18 wt %. Moreover, according to a quantitative analysis of the OH concentration in the vicinity of the surface of the silica core glass rod by using the FT-IR method, the OH concentration was equal to or less than the detection limit (approximately 1 ppm).

Moreover, the optical fiber preform obtained in accordance with the second embodiment was drawn to produce an optical fiber conforming to ITU-T G.652, and a transmission loss at a wavelength of 1550 nm thereof was measured to be very low, i.e., 0.159 dB/km. In addition, an amount of increase in transmission loss, caused by OH absorption, at a wavelength of 1385 nm in the optical fiber was measured to be sufficiently low, i.e., about 0.3 dB/km, with which the optical fiber may be used for transmission at the wavelength band.

In the second embodiment, the alkali-metal-doped silica soot is formed, by using the OVD method, on an outer circumference of the silica core glass rod formed by using the VAD method, and the alkali-metal-doped silica soot thus formed is vitrified to form the alkali-metal-doped silica glass portion. A modified example of the second embodiment may be provided in which a center portion of the alkali-metal-doped silica glass rod formed by using the VAD method is drilled to produce an alkali-metal-doped silica glass tube, the silica core glass rod formed by using the VAD method is inserted to and integrated with the alkali-metal-doped silica glass tube to form the alkali-metal-doped silica glass portion on an outer circumference of the silica core glass rod.

(Comparison Example) Next, a comparison example of the present disclosure will be explained. To start with, a silica soot doped with the alkali metal was synthesized by using the VAD method illustrated in FIG. 3. In this state, potassium chloride (KCl) was used as the alkali metal material, and the potassium chloride was turned into aerosol particles, and then transferred to the burner of the VAD apparatus. Then, the KCl aerosol particles and a silica glass material were projected together with the oxyhydrogen flame from the burner to the target rod to synthesize a potassium-doped silica soot. Subsequently, the synthesized potassium-doped silica soot was dehydrated and sintered in a vitrification furnace to obtain a silica core glass rod. For dehydration conditions, a furnace temperature was set at 1100° C. and chlorine partial pressure was set at 1.5%. Potassium was not detected in an analysis performed to the silica core glass rod after the vitrification using an electron probe micro analyzer (EPMA) method. In an analysis, by the ICP analysis, of potassium concentration in a potassium-doped silica soot synthesized similarly to the above-described method for concentration analysis, 1.2 wt % of potassium was detected. That indicates that, in the silica core glass rod of the present comparison example, most of the potassium used for doping when synthesizing the silica soot has been volatilized in the dehydration step. Moreover, a silica soot was synthesized around the silica core glass rod by the OVD method by the methods in accordance with the first and second embodiments, the silica soot was doped with fluorine by a vitrification furnace and was vitrified to turn the silica soot into a cladding portion, and thereby an optical fiber preform was produced. When the produced optical fiber preform was drawn to produce an optical fiber, a transmission loss at a wavelength of 1550 nm was high, such as 0.245 dB/km.

Although, in the above-described first and second embodiments, the alkali-metal-doped silica glass rod and the alkali-metal-doped silica glass portion are removed fully by drilling or grinding, they are not necessarily fully removed as long as their impurity concentrations are within tolerable ranges. For example, as a modified example of the second embodiment, when the silica core glass rod contains a portion to be the cladding portion on an outer circumference of a portion to be the core portion, the alkali-metal-doped silica glass portion formed on an outer circumference of the silica core glass rod is supposed to be positioned away from the core portion by a thickness of the cladding portion. Therefore, the impurities contained in the alkali-metal-doped silica glass portion may sometimes affect the transmission loss of the optical fiber produced thereafter very little. In this case, the alkali-metal-doped silica glass portion is not necessarily removed.

In the above-described first and second embodiments, the silica glass rod in which the alkali metal is diffused becomes the core portion. However, since the present disclosure is not limited to this, and since the silica glass rod may be a part of the core portion, for example, a glass layer forming another part of the core portion may be formed on an outer circumference of this silica glass rod and the cladding portion may be formed on an outer circumference thereof.

Moreover, the present disclosure includes arbitrary combination of the above-described respective elements. In addition, all of other embodiments, examples, operational technologies or the like achieved by an ordinary skilled person or the like in the art based on the above-described embodiments are included within the scope of the present disclosure.

As described above, the method of producing the optical fiber preform and the optical fiber according to the present disclosure is useful for producing an optical fiber with a low impurity concentration.

According to the present disclosure, since the alkali metal is diffused from the alkali-metal-doped silica glass body to the silica glass body, effects of being capable of doping the core portion with a desirable concentration of alkali metal easily and effectively and producing an optical fiber preform having very low impurity concentration are obtained.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of producing an optical fiber preform, the method comprising:
    a silica glass body forming step of forming a silica glass body to be at least a portion of a core portion;
    an alkali-metal-doped silica glass body forming step of forming an alkali-metal-doped silica glass body doped with an alkali metal around the silica glass body such that the alkali-metal-doped silica glass body contacts the silica glass body, wherein the alkali-metal-doped silica glass body is formed by:
        synthesizing an alkali-metal-doped silica soot doped with the alkali metal by using an outside vapor deposition (OVD) method, and
        a step of vitrifying the alkali-metal-doped silica soot such that a dehydration step in a chlorine-based gas atmosphere is not performed in the vitrification step, but only a sintering step as heat treatment in a non-chlorine-based atmosphere is performed;
    a diffusing step of diffusing the alkali metal from the alkali-metal-doped silica glass body to the silica glass body by a heat treatment; and
    after the diffusing, a grinding and removing step of removing the alkali-metal-doped silica glass body by grinding, wherein:
        the silica glass body forming step comprises forming a silica glass rod having a first outer diameter,
        the alkali-metal-doped silica glass body forming step comprises forming an alkali-metal-doped silica glass body having a second outer diameter, and
        the grinding and removing step comprises removing the entire alkali-metal-doped silica glass body and an outer portion of the silica glass rod such that a remaining portion of the silica glass rod has a third outer diameter which is less than the first outer diameter.

2. The method of claim 1, wherein the first outer diameter is 20 mm, the second outer diameter is 36 mm and the third outer diameter is 18 mm.

3. A method of producing an optical fiber, the method comprising drawing an optical fiber preform produced by a method of producing an optical fiber preform, the method of producing an optical fiber preform including:
    a silica glass body forming step of forming a silica glass body to be at least a portion of a core portion;
    an alkali-metal-doped silica glass body forming step of forming an alkali-metal-doped silica glass body doped with an alkali metal around the silica glass body such that the alkali-metal-doped silica glass body contacts the silica glass body, wherein the alkali-metal-doped silica glass body is formed by:
        synthesizing an alkali-metal-doped silica soot doped with the alkali metal by using the outside vapor deposition (OVD) method, and
        a step of vitrifying the alkali-metal-doped silica soot such that a dehydration step in a chlorine-based gas atmosphere is not performed in the vitrification step, but only a sintering step as heat treatment in a non-chlorine-based atmosphere is performed;
    a diffusing step of diffusing the alkali metal from the alkali-metal-doped silica glass body to the silica glass body by a heat treatment and
    after the diffusing, a grinding and removing step of removing the alkali-metal-doped silica glass body by grinding, wherein:
        the silica glass body forming step comprises forming a silica glass rod having a first outer diameter,
        the alkali-metal-doped silica glass body forming step comprises forming an alkali-metal-doped silica glass body having a second outer diameter, and
        the grinding and removing step comprises removing the entire alkali-metal-doped silica glass body and an outer portion of the silica glass rod such that a remaining portion of the silica glass rod has a third outer diameter which is less than the first outer diameter.

4. The method of claim 3, wherein the first outer diameter is 20 mm, the second outer diameter is 36 mm and the third outer diameter is 18 mm.

* * * * *